United States Patent
Apte et al.

(10) Patent No.: US 11,609,834 B2
(45) Date of Patent: Mar. 21, 2023

(54) EVENT BASED AGGREGATION FOR DISTRIBUTED SCALE-OUT STORAGE SYSTEMS

(71) Applicant: Druva Inc., Sunnyvale, CA (US)

(72) Inventors: Anand Apte, Pune (IN); Milind Vithal Borate, Pune (IN); Pinkesh Bardiya, Pune (IN); Prahlad Nishal, Pune (IN); Yogendra Acharya, Pune (IN)

(73) Assignee: Druva Inc., Sunnyvale, CA (US)

( * ) Notice: Subject to any disclaimer, the term of this patent is extended or adjusted under 35 U.S.C. 154(b) by 86 days.

(21) Appl. No.: 17/121,087

(22) Filed: Dec. 14, 2020

(65) Prior Publication Data

US 2021/0224175 A1    Jul. 22, 2021

(30) Foreign Application Priority Data

Jan. 21, 2020 (IN) .............................. 202041002634

(51) Int. Cl.
*G06F 11/30* (2006.01)
*G06F 11/32* (2006.01)
*G06F 3/06* (2006.01)

(52) U.S. Cl.
CPC ........ *G06F 11/3034* (2013.01); *G06F 3/0604* (2013.01); *G06F 3/0614* (2013.01); *G06F 3/0653* (2013.01); *G06F 3/0683* (2013.01); *G06F 11/3075* (2013.01); *G06F 11/324* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 2006/0242371 A1* | 10/2006 | Shono | G06F 11/1456 711/162 |
| 2016/0259834 A1* | 9/2016 | Bishop | G06F 16/27 |
| 2019/0243907 A1* | 8/2019 | Baughman | G06F 16/182 |
| 2020/0094737 A1* | 3/2020 | Furukawa | B60W 50/0097 |
| 2021/0152638 A1* | 5/2021 | Fang | G06F 3/0619 |

* cited by examiner

*Primary Examiner* — Charles Rones
*Assistant Examiner* — Jonah C Krieger
(74) *Attorney, Agent, or Firm* — IceMiller LLP (57) ABSTRACT

A system for estimating one or more data storage parameters and/or statistics in a data storage system is presented. The data storage system includes a plurality of storage containers. The system includes a snapshot module, a container stats aggregator, a synchronization module, a global stats aggregator, and storage stats estimator.

20 Claims, 4 Drawing Sheets

EVENT BASED AGGREGATION FOR DISTRIBUTED SCALE-OUT STORAGE SYSTEMS

CROSS REFERENCE TO RELATED APPLICATION

This application claims a benefit of, and priority to, India Provisional Patent Application No. 202041002634, filed Jan. 21, 2020, the contents of which is incorporated by reference in its entirety.

BACKGROUND

Embodiments of the present invention generally relate to systems and methods for performing data storage analytics in a data storage system, and more particularly to systems and methods for estimating data storage parameters and/or statistics in a distributed data storage system.

One of the recent trends in enterprise data backup and storage is use of scale-out or distributed storage solutions. Scale-out storage systems have an architecture in which the total amount of storage space can be expanded through the addition of devices in connected arrays with their own resources thereby providing efficient storage systems.

It is desirable to determine current operating parameters and statistics for such storage systems, particularly for always-on, distributed scale-out storage systems. For example, it may be required to estimate a current storage size for a system where storage objects are continuously getting added, modified or deleted. It is difficult to obtain such data for every change occurring within the system. Moreover, it may be unfeasible to retain data corresponding to all the events for reasons such as cost, logistics, data loss for events/aggregates, and so forth.

Thus, there is a need for systems and methods to determine real-time storage parameters and/or statistics for distributed scale-out data storage systems.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for estimating one or more data storage parameters and/or statistics in a data storage system is presented. The data storage system includes a plurality of storage containers. The system includes a snapshot module, a container stats aggregator, a synchronization module, a global stats aggregator, and storage stats estimator. The snapshot module is configured to independently access a snapshot of each storage container of the plurality of storage containers at a defined time interval. The container stats aggregator is configured to independently estimate a current aggregate state of each storage container of the plurality of storage containers using a corresponding snapshot. The synchronization module is configured to synchronize event aggregation for each storage container of the plurality of storage containers between the time interval at which the corresponding snapshot was created and a time interval at which a global stats aggregation job is initiated. The global stats aggregator is configured to estimate a consistent aggregate state for the data storage system based on the estimated current aggregate state of each storage container of the plurality of storage containers and the corresponding synchronized event aggregate. The storage stats estimator is configured to estimate the one or more data storage parameters and/or statistics based on the estimated consistent aggregate state.

According to another example embodiment, a system for estimating one or more data storage parameters and/or statistics in a data storage system is presented. The data storage system includes a plurality of storage containers. The system includes a memory storing one or more processor-executable routines; and a processor communicatively coupled to the memory. The processor is configured to access a snapshot of each storage container of the plurality of storage containers at a defined time interval and estimate a current aggregate state of each storage container of the plurality of storage containers using a corresponding snapshot. The processor is further configured to synchronize event aggregation for each storage container of the plurality of storage containers between the time interval at which the corresponding snapshot was created and a time interval at which a global stats aggregation job is initiated. The processor is furthermore configured to estimate a consistent aggregate state for the data storage system based on the estimated current aggregate state of each storage container of the plurality of storage containers and the corresponding synchronized event aggregate. The processor is moreover configured to estimate the one or more data storage parameters and/or statistics based on the estimated consistent aggregate state.

According to another example embodiment, a method for estimating one or more data storage parameters and/or statistics in a data storage system is presented. The data storage includes a plurality of storage containers. The method includes accessing a snapshot of each storage container of the plurality of storage containers at a defined time interval, and estimating a current aggregate state of each storage container of the plurality of storage containers using a corresponding snapshot. The method further includes synchronizing event aggregation for each storage container of the plurality of storage containers between the time interval at which the corresponding snapshot was created and a time interval at which a global stats aggregation job is initiated. The method furthermore includes estimating a consistent aggregate state for the data storage system based on the estimated current aggregate state of each storage container of the plurality of storage containers and the corresponding synchronized event aggregate. The method moreover includes estimating the one or more data storage parameters and/or statistics based on the estimated consistent aggregate state.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for data storage analytics in a distributed data storage system. Some embodiments of the present description provide systems and methods to estimate data storage parameters and/or statistics (stats) in a distributed data storage system based on event-based aggregation.

Figure 1:
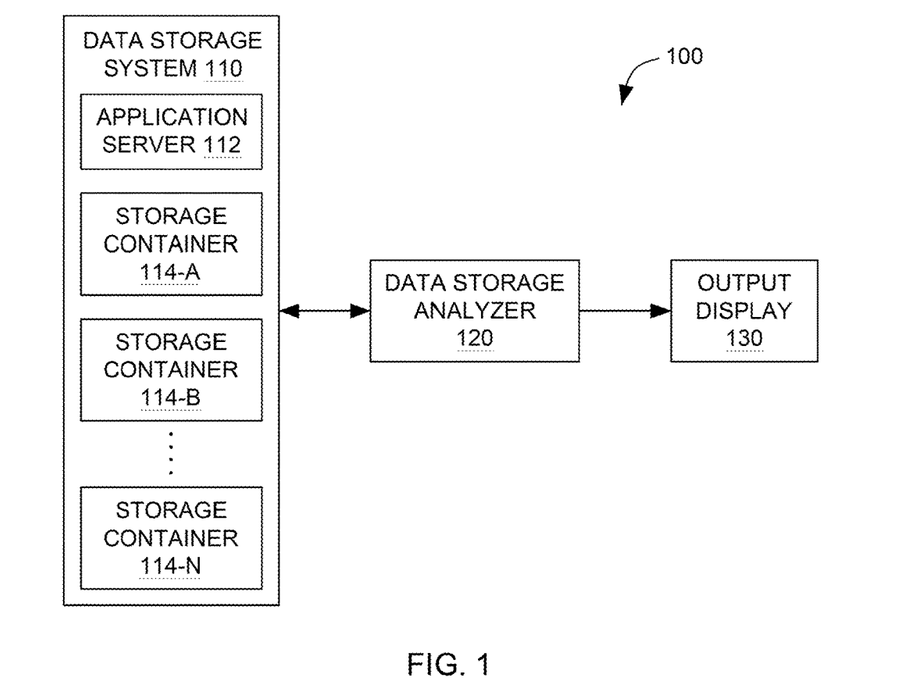
FIG. 1 is a block diagram illustrating an example data storage environment, according to some aspects of the present description.

FIG. 1 illustrates an example data storage environment 100, in accordance with some embodiments of the present description. The data storage environment 100 includes a data storage system 110, a data storage analyzer 120 and an output display 130.

The data storage system 110 includes a distributed scale-out storage system in some embodiments. A "distributed storage system" is a storage infrastructure that can split data across multiple physical servers, and often across more than one data center. It typically takes the form of a cluster of storage units, with a mechanism for data synchronization and coordination between cluster nodes. Office 365 Exchange, Gmail, AWS DynamoDB, Amazon S3 and Microsoft Azure Blob Storage are non-limiting examples of cloud-based data storage systems. A "scale-out storage" is a storage architecture in which the total amount of disk space can be expanded through the addition of new hardware that can be configured as the need arises. Scale-out storage can harness the extra storage added across arrays and also use added devices to increase network storage capacity, adding performance and addressing the need for additional storage.

The data storage system 110 may include an application server 112 configured to function as an interface between the user and the data storage system 110. The data storage system 110 further includes a plurality of storage containers such as generally represented by reference numerals 114A, 114B through 114N. Additional storage containers may be coupled to the data storage system 110 based upon the storage requirements as the need arises.

The storage containers 114A, 114B . . . 114N may be pre-defined within the data storage system based on one more of the data storage system type, file database type, data stored, and the like. Non-limiting examples of storage containers may include individual devices coupled to the data storage system 110, single shared systems, individual mailboxes in a mailbox delivery system, and so forth. In instances where the storage containers are defined by devices, these devices may include any computing devices that have data that needs to be stored. Examples of such devices include without limitation workstations, personal computers, desktop computers, or other types of generally fixed computing systems such as mainframe computers, servers, and minicomputers. Other examples of such devices include mobile or portable computing devices, such as one or more laptops, tablet computers, personal data assistants, mobile phones (such as smartphones), IoT devices, wearable electronic devices such as smart watches, and other mobile or portable computing devices such as embedded computers, set top boxes, vehicle-mounted devices, wearable computers, etc. Servers can include mail servers, file servers, database servers, virtual machine servers, and web servers.

Figure 2:
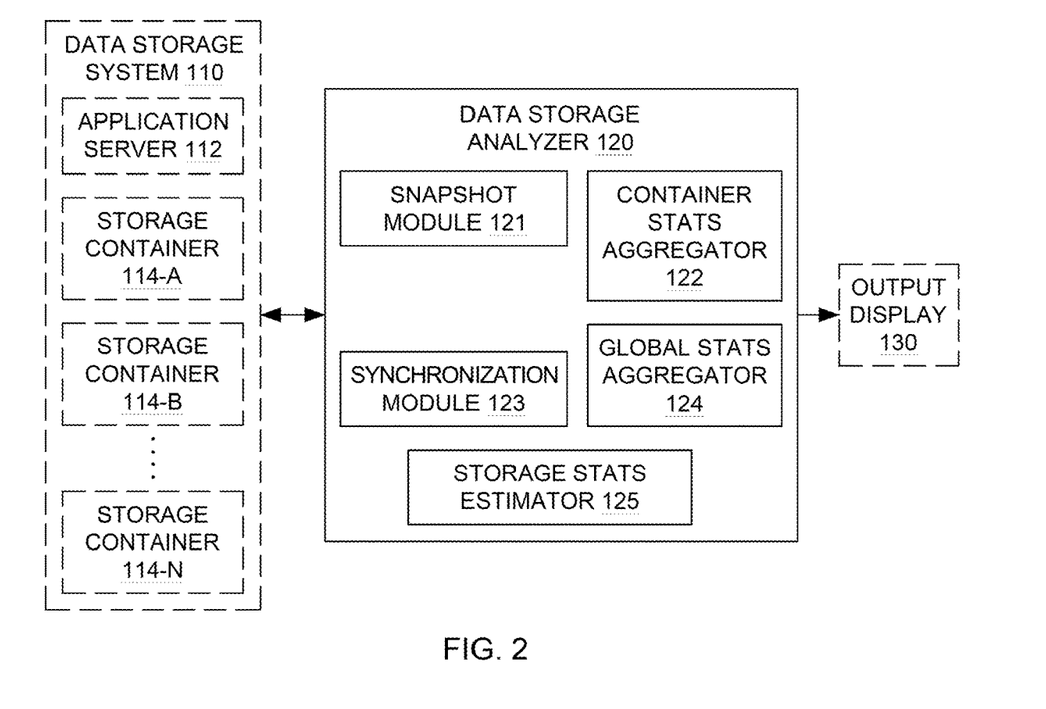
FIG. 2 is a block diagram illustrating an example system for data storage analytics, according to some aspects of the present description.

The data storage analyzer 120 is a system configured to estimate one or more data storage parameters and/or statistics for the data storage system 110. FIG. 2 illustrates a data storage analyzer 120 in accordance with some embodiments of the present description. The data storage analyzer 120 is communicatively coupled to the data storage system 110 and an output display 130. The data storage analyzer 120 includes a snapshot module 121, a container stats aggregator 122, a synchronization module 123, a global stats aggregator 124, and a storage stats estimator 125. Each of these components are described in further detail below.

The snapshot module 121 is configured to independently access and traverse a snapshot of each storage container of the plurality of storage containers 114A, 114B . . . 114N exactly once. In some embodiments, the snapshot module is configured to independently access a snapshot of each storage container of the plurality of storage containers 114A, 114B,114N at different time intervals. In some embodiments, such snapshots may be stored in a memory, as mentioned later.

In some embodiments, the snapshot module 121 is further configured to record a unique ID corresponding to a particular storage container of the plurality of storage containers 114A, 114B . . . 114N for which the snapshot was accessed. The unique ID may be recorded in a snapshot database or in the memory. The snapshot module 121 may be further configured to record a snapshot time-stamp (TSi) corresponding to the time interval at which the snapshot for a particular storage container was created, wherein "i" is an integer between 1 to N, where N is the number of storage containers. The snapshot time-stamp may be recorded by the snapshot module along with the unique ID in the snapshot database or in the memory.

The container stats aggregator 122 is communicatively coupled to the snapshot module 121. The container stats aggregator 122 is configured to independently estimate a current aggregate state of each storage container of the plurality of storage containers 114A, 114B . . . 114N using a corresponding snapshot accessed by the snapshot module. The container stats aggregator 122 is also communicatively coupled to the global stats aggregator 124 and configured to communicate the current aggregate state estimated for each storage container to the global stats aggregator 124.

The data storage analyzer 120 further includes a synchronization module 123 configured to synchronize event aggregation for each storage container of the plurality of storage containers 114A, 114B . . . 114N between the time interval at which the corresponding snapshot was created and a time interval at which a global stats aggregation job is initiated.

The synchronization module 123 is configured to extract events for each storage container of the plurality of storage containers 114A, 114B . . . 114N between the timestamp TSi and a timestamp TG corresponding to the time interval at which the global stats aggregation job is initiated. The synchronization module 123 is further configured to estimate aggregate stats of the extracted events for each storage container of the plurality of storage containers 114A, 114B . . . 114N, and synchronize event aggregation for each storage container of the plurality of storage containers 114A, 114B . . . 114N based on the estimated aggregate stats of the extracted events.

In some embodiments, the synchronization module 123 is configured to receive the unique ID and the timestamp TSi from the snapshot database for the storage container for which event aggregation needs to be synchronized. The synchronization module 123 is further configured to receive the timestamp TG from the global stats aggregator 124.

The global stats aggregator 124 is configured to estimate a consistent aggregate state for the data storage system 110 based on the estimated current aggregate state of each storage container of the plurality of storage containers 114A, 114B . . . 114N and the corresponding synchronized event aggregate.

In some embodiments, the global stats aggregator 124 is configured to estimate the consistent aggregate state for the data storage system 110 based on the estimated current aggregate state of each storage container of the plurality of storage containers 114A, 114B . . . 114N and the corresponding estimated aggregate stats of the extracted events.

The global stats aggregator 124 is configured to receive the estimated current aggregate state of each storage container from the container stats aggregator 122. The global stats aggregator 124 is further configured to receive the estimated aggregate stats of the extracted events for each storage container from the synchronization module 123. The global stats aggregator is further configured to estimate the consistent aggregate state for the data storage system 110 by adding the estimated current aggregate state of each storage container with the corresponding estimated aggregate stats of the extracted events.

The data storage analyzer 120 further includes a storage stats estimator 125 configured to estimate the one or more data storage parameters and/or statistics based on the estimated consistent aggregate state. Non-limiting examples of one or more data storage parameters and/or statistics include total storage size, total number of files, number of files per file extension, size of files per file extension, number of files per file type (e.g., audio file, pdf document, etc.), size of files per file type, number of files in a defined size range (e.g., files less than 1 MB, between 1 to 50 MB, between 50 to 500 MB, greater than 500 MB etc.), number of files modified in a defined time range, size of files modified in a defined time range, number of files and their modification time in a defined time range, size of files and their modification time in a defined time range, or combinations thereof. The estimated one or more data storage parameters and/or statistics may be displayed on an output display 130 as shown in FIG. 2.

Thus, embodiments of the present description provide a solution to estimate a consistent aggregate state for the entire data storage system 110 by first estimating a current aggregate state of pre-defined granular containers within the data storage system 110 using snapshots at defined time intervals. The current aggregate state is thereafter synchronized to the time interval at which the global aggregation job is initiated, using event-based aggregation.

Figure 3:
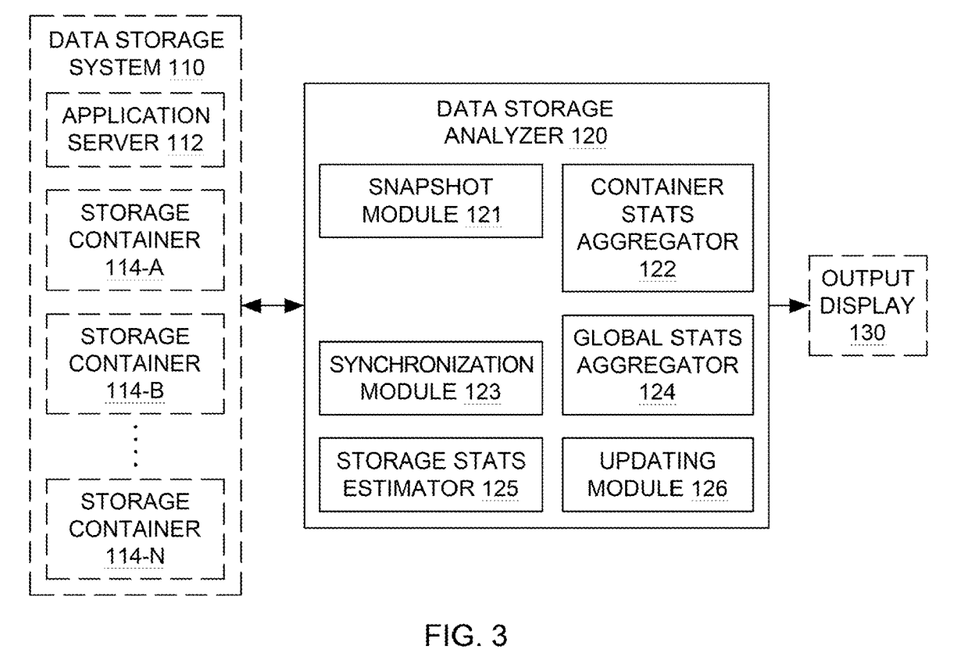
FIG. 3 is a block diagram illustrating an example system for data storage analytics, according to some aspects of the present description.

In some embodiments, the consistent aggregate stats for the data storage system 110 may be continuously updated using event-based aggregation. In such embodiments, as shown in FIG. 3, the data storage analyzer 120 may further include an updating module 126 configured to periodically update the consistent aggregate state of the data storage system based on event-based aggregation for all the storage containers whose IDs have been recorded by the snapshot module 121.

Figure 4:
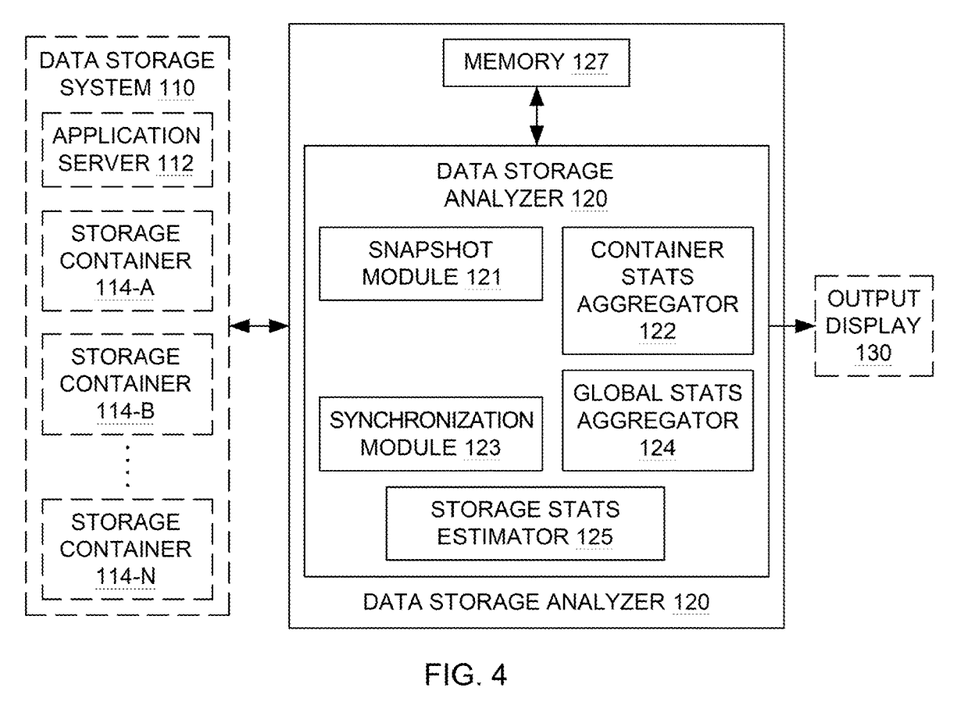
FIG. 4 is a block diagram illustrating an example system for data storage analytics, according to some aspects of the present description.

Referring now to FIG. 4, a data storage analyzer 120 in accordance with some embodiments of the present description is illustrated. The data storage analyzer 120 includes a memory 127 storing one or more processor-executable routines and a processor 128 communicatively coupled to the memory. The processor 128 further includes a snapshot module 121, a container stats aggregator 122, a synchronization module 123, a global stats aggregator 124, and a storage stats estimator 125. Each of these components is described in detail earlier. The processor 128 is further configured to execute the processor-executable routines to perform the steps illustrated in the flow-chart of FIG. 5.

Figure 5:
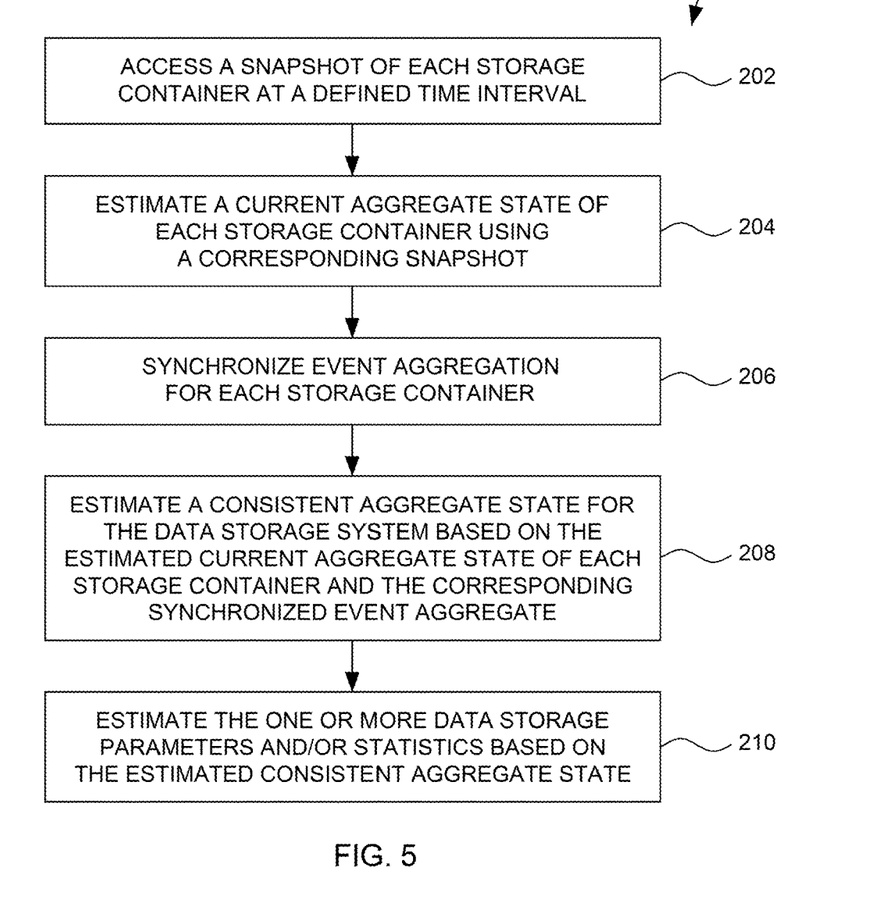
FIG. 5 is a flow chart illustrating a method for data storage analytics, according to some aspects of the present description.

FIG. 5 is a flowchart illustrating a method 200 for estimating one or more data storage parameters and/or statistics in a data storage system including a plurality of storage containers. The method 200 may be implemented using the systems of FIGS. 2-4, according to some aspects of the present description. Each step of the method 200 is described in detail below.

At block 202, the method 200 includes accessing and traversing a snapshot of each storage container of the plurality of storage containers exactly once. In some embodiments, block 202 includes independently accessing a snapshot of each storage container of the plurality of storage containers 114A, 114B . . . 114N at different time intervals.

Block 202 may further include recording a unique ID corresponding to a particular storage container of the plurality of storage containers for which the snapshot was accessed and traversed. Block 202 may also include recording a snapshot time-stamp ($T_{Si}$) corresponding to the time interval at which the snapshot was created, wherein "i" is an integer between 1 to N, and N is the number of storage containers. The snapshot time-stamp may be recorded along with the unique ID in the snapshot database or in memory as mentioned earlier.

At block 204, the method 200 includes estimating the current aggregate state of each storage container of the plurality of storage containers using a corresponding snapshot. By way of example, a current aggregate size of a particular storage container may be estimated at block 204 based on the size of the snapshot corresponding to that particular storage container. Similarly, other aggregates for the storage containers may be estimated using metadata of objects present in their corresponding snapshots.

The method 200 further includes, at block 206, synchronizing event aggregation for each storage container of the plurality of storage containers between the time interval at which the corresponding snapshot was created and a time interval at which a global stats aggregation job is initiated.

In some embodiments, block 206 includes synchronizing event aggregation includes extracting events for each storage container of the plurality of storage containers between the timestamp $T_{Si}$ and a timestamp $T_G$ corresponding to the time interval at which a global stats aggregation job is initiated. In such instances, block 206 further includes estimating aggregate stats of the extracted events for each storage container.

At block 208, the method 200 includes estimating a consistent aggregate state for the data storage system based on the estimated current aggregate state of each storage container of the plurality of storage containers and the corresponding synchronized event aggregate.

In some embodiments, the block 208 includes estimating the consistent aggregate state for the data storage system based on the estimated current aggregate state of each storage container of the plurality of storage containers and the corresponding estimated aggregate stats of the extracted events. The consistent aggregate state for the data storage system may be estimated by adding the estimated current aggregate state of each storage container with the corresponding estimated aggregate stats of the extracted events.

The method further includes, at block 210, estimating the one or more data storage parameters and/or statistics based on the estimated consistent aggregate state. Non-limiting examples of one or more data storage parameters and/or statistics include total storage size, total number of files, number of files per file extension, size of files per file extension, number of files per file type (e.g., audio file, pdf document, etc.), size of files per file type, number of files in a defined size range (e.g., files less than 1 MB, between 1 to 50 MB, between 50 to 500 MB, greater than 500 MB etc.), number of files modified in a defined time range, size of files modified in a defined time range, number of files and their modification time in a defined time range, size of files and their modification time in a defined time range, or combinations thereof.

Thus, embodiments of the present description provide a solution to estimate a consistent aggregate state for the entire data storage system by first estimating a current aggregate state of pre-defined granular containers within the data storage system using snapshots at defined time intervals. The current aggregate state is thereafter synchronized to the time interval at which the global aggregation job is initiated, using event-based aggregation.

In some embodiments, the consistent aggregate stats for the data storage system may be continuously updated using event-based aggregation. In such instances, the method 200 further includes periodically updating the consistent aggregate state of the data storage system based on event-based aggregation for all the storage containers whose IDs have been recorded in snapshot database or in memory.

Figure 6:
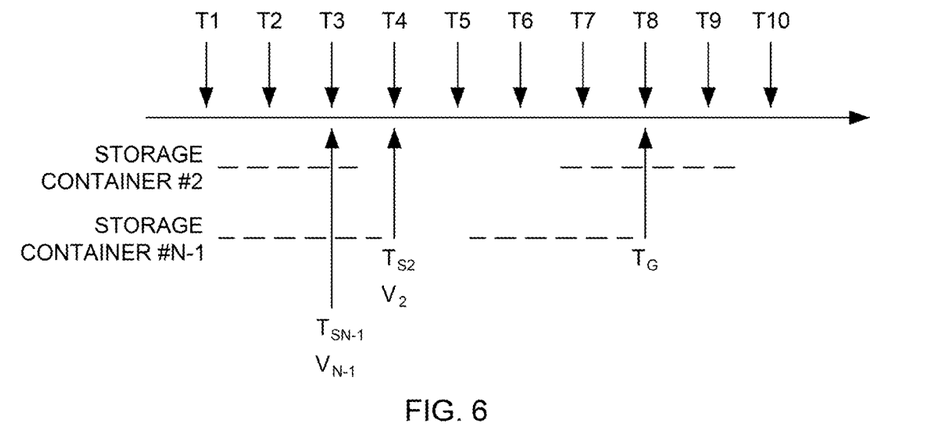
FIG. 6 is a schematic illustration of a global aggregation job, according to some aspects of the present description.

FIG. 6 illustrates a global aggregation job implemented by the global stats aggregator 124 of FIGS. 2-4, according to an example embodiment. In the embodiment illustrated, T1, T2, T3 and so forth correspond to the time intervals in the global aggregation job timeline. The example embodiment illustrates two storage containers represented by storage container #2 and storage container #N−1. The dashed lines correspond to the stream of changes for each of the storage containers across the timeline.

Referring now to storage container #2, as shown in FIG. 6, a snapshot of the storage container is taken at $T_{S2}$. The snapshot $V_2$ is a full scan for the storage container #2 that captures the entire state at $T_{S2}$, which corresponds to T4. The snapshot V2 is used to estimate the current aggregate state for the storage container #2 at $T_{S2}$. The current aggregate state will be added to the global stats.

In the example illustrated in FIG. 6, the global aggregation job is initiated at $T_G$ corresponding to $T_8$. Thus, in order to synchronize the current aggregate state of the storage container #2 to the global aggregation time interval $T_G$, any changes/events that occur for storage container #2 between $T_{S2}$ and $T_G$ (i.e., between time intervals T4 and T8) are extracted and their aggregate stats estimated and appended to the global stats.

This would provide a consistent aggregate state for the entire data storage as any changes before T4 would be captured by the full scan at $TS_2$. Further, the changes between T4 and T8 would be captured based on event aggregation. Furthermore, any changes that happen after T8 could be incrementally captured using event-based aggregation.

Similarly, for storage container #N−1, as shown in FIG. 6, a snapshot of the storage container is taken at $T_{SN-1}$. The snapshot $V_{N-1}$ is a full scan for the storage container #N−1 that captures the entire state at $T_{SN-1}$, which corresponds to T3. The snapshot $V_{N-1}$ is used to estimate the current aggregate state for the storage container #N−1 at $T_{SN-1}$. The current aggregate state will be added to the global stats.

In order to synchronize the current aggregate state of the storage container #N−1 to the global aggregation time interval $T_G$, any changes/events that occur for storage container #N−1 between $TS_{N-1}$ and $T_G$ (i.e., between time intervals T3 and T8) are extracted and their aggregate stats estimated and appended to the global stats.

In some embodiments $T_{Si}$ and $T_G$ may correspond to a time between the specified time intervals on the global aggregation job timelines. In such instances, the event aggregation job may be executed to provide for a buffer for any loss in events. For example, if $T_{Si}$ is between T4 and T5 and $T_G$ is between T7 and T8, the event extraction job may be executed for time intervals between T4 and T8, thus ensuring that none of the events are lost in the event aggregation job.

For the example illustrated in FIG. 6, before a full scan is initiated, the storage container may be marked in a snapshot database or in memory as FULLSCAN_PENDING. After a full scan of the storage container is initiated using a snapshot for the corresponding container, a timestamp (which could be clock time or a logical version number) may also be updated in the snapshot database or in memory and the state of the container may be changed to FULLSCAN_IN-PROGRESS. Further, once the full scan is completed and the current aggregate state for the container (that corresponds to the snapshot) is available, the same would be added to the global storage level stats. In order to synchronize the current aggregate state, a query may be run to extract events in the global event stream that belong to this particular storage container, with timestamp between $T_{Si}$ and $T_G$. The aggregate stats of this subset of events would be added to global storage level stats. This phase may be referred to as synchronization phase. Thus, once the full scan and the synchronization phase for all the containers in the data storage system is complete, it reaches a consistent current state for the storage level stats.

Further, a unique ID of the storage container may be added to a whitelist stored in snapshot database or in memory, which may be referred to during the next iteration of the global aggregation job. In order to keep the consistent current state of the storage system updated, a global updating job aggregating all events may be run periodically by extracting all the events for the whitelisted containers (for time interval starting from timestamp of previous run to the timestamp of the current run of the updating job e.g., between T8 and T9), and adding the aggregated stats of the extracted events to the global stats.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®

Figure 7:
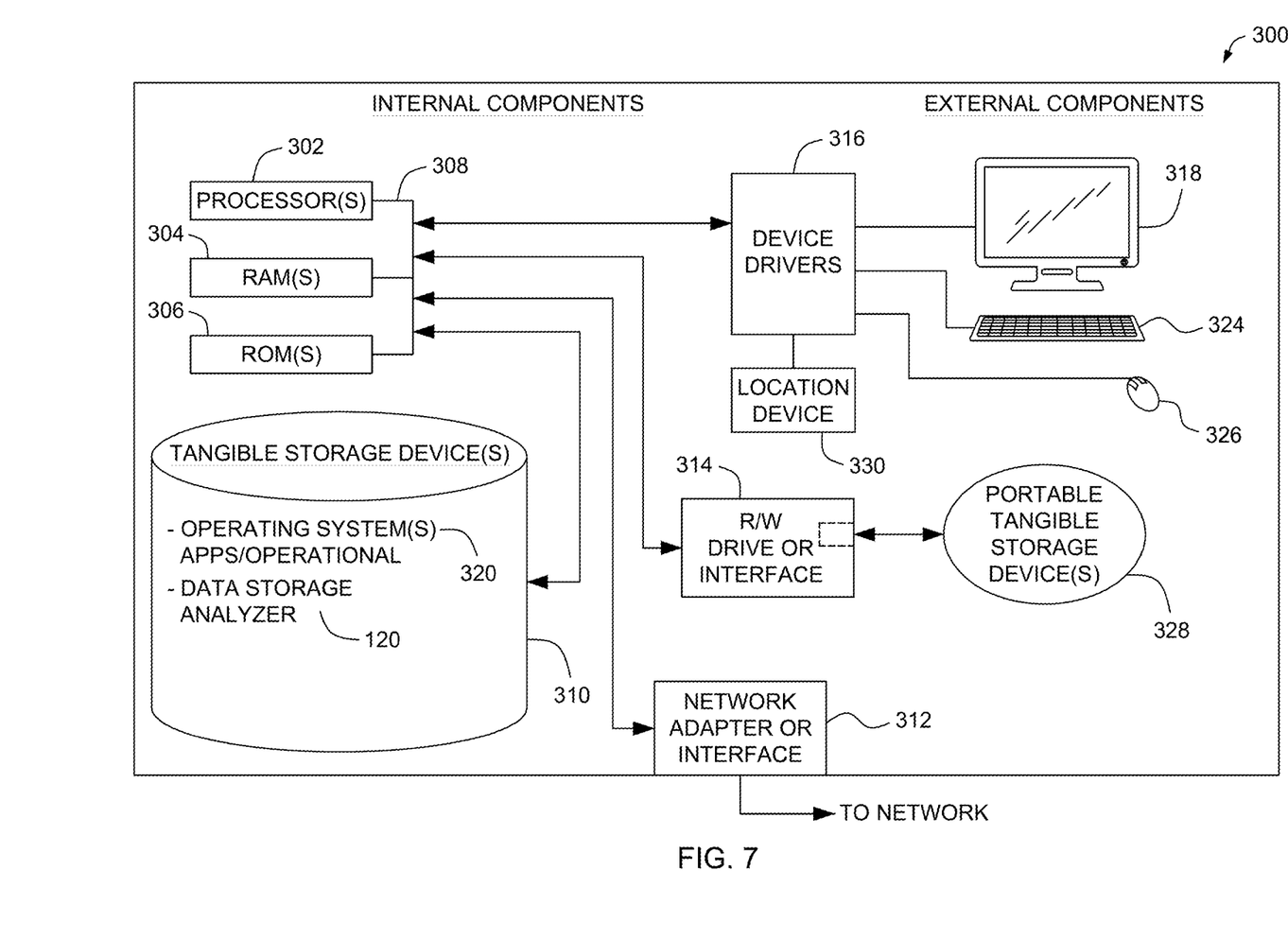
FIG. 7 is a block diagram illustrating an example computer system, according to some aspects of the present description.

One example of a computing system 300 is described below in FIG. 7. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the data storage analyzer 120. Both, the operating system 320 and data storage analyzer 120 are executed by processor 302 via one or more respective RAMs 304 (which typically includes cache memory). The execution of the operating system 320 and/or the analyzer 120 by the processor 302, configures the processor 302 as a special-purpose processor configured to carry out the functionalities of the operation system 320 and/or the data storage analyzer 120, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the data storage analyzer 120 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system comprising:
a snapshot module configured to iteratively access, at a defined time interval, (i) a first plurality of snapshots and (ii) one or more second pluralities of snapshots of (i) a third storage container and (ii) one or more fourth storage containers, respectively, wherein the containers are associated with a same data storage system, and wherein the first snapshots are performed concurrently with the one or more second snapshots;
a container statistics aggregator configured to estimate a current aggregate state of each of the containers using the corresponding snapshots;
a synchronization module configured to synchronize the estimated current aggregate state of each of the containers based on at least one change thereof occurring between a first time at which the last iteratively accessed snapshot of the corresponding plurality of snapshots was created and a second time at which a global statistics aggregator initiates an estimate of a consistent aggregate state;
the global statistics aggregator configured to perform the estimate of the consistent aggregate state based on the synchronized aggregate state of each of the containers; and
a storage statistics estimator configured to estimate one or more data storage parameters and/or statistics based on the estimated consistent aggregate state.

2. The system of claim 1, wherein the snapshot module is further configured to record:

a unique ID corresponding to one of the containers for which one of the last iteratively accessed snapshots was accessed, and a time at which the one snapshot was created, wherein "i" is an integer between 1 to N, where N is the number of containers.

3. The system of claim 2, wherein the synchronization module is further configured to:

extract one or more events for each of the containers between the first time and the second time, estimate aggregate statistics of the extracted events, and synchronize event aggregation for each of the containers based on the estimated aggregate statistics.

4. The system of claim 3, wherein the global statistics aggregator is further configured to perform the estimate of the consistent aggregate state based on the estimated aggregate statistics.

5. The system of claim 2, further comprising an updating module configured to periodically update the consistent aggregate state of the data storage system based on event-based aggregation for all the storage containers whose IDs have been recorded by the snapshot module.

6. The system of claim 1, wherein the data storage system is a distributed scale-out storage system.

7. The system of claim 1, wherein the one or more data storage parameters and/or statistics comprise total storage size, total number of files, number of files per file extension, size of files per file extension, number of files per file type, size of files per file type, number of files in a defined size range, number of files modified in a defined time range, size of files modified in a defined time range, number of files and their modification time in a defined time range, size of files and their modification time in a defined time range, or combinations thereof.

8. A system, comprising:

a memory storing instructions executable by a processor; and the processor communicatively coupled to the memory, the processor being configured to:

iteratively access, at a defined time interval, (i) a first plurality of snapshots and (ii) one or more second pluralities of snapshots of (i) a third storage container and (ii) one or more fourth storage containers, respectively, wherein the containers are associated with a same data storage system, and wherein the first snapshots are performed concurrently with the one or more second snapshots;

estimate a current aggregate state of each of the containers using the corresponding snapshots;

synchronize the estimated current aggregate state of each of the containers based on at least one change thereof occurring between a first time at which the last iteratively accessed snapshot of the corresponding plurality of snapshots was created and a second time at which a global statistics aggregator initiates an estimate of a consistent aggregate state;

perform the estimate of the consistent aggregate state based on the synchronized aggregate state of each of the containers; and estimate one or more data storage parameters and/or statistics based on the estimated consistent aggregate state.

9. The system of claim 8, wherein the processor is further configured to:

record a unique ID corresponding to one of the containers for which one of the last iteratively accessed snapshots was accessed, and record time at which the one snapshot was created, wherein "i" is an integer between 1 to N, and N is the number of containers.

10. The system of claim 9, wherein the processor is further configured to:

extract one or more events for each of the containers between the first time and the second time, estimate aggregate statistics of the extracted events, and synchronize event aggregation for each of the containers based on the estimated aggregate statistics.

11. The system of claim 10, wherein the processor is further configured to perform the estimate of the consistent aggregate state based on the estimated aggregate statistics.

12. The system of claim 9, wherein the processor is further configured to periodically update the consistent aggregate state of the data storage system based on event-based aggregation for all the storage containers whose IDs have been recorded.

13. The system of claim 8, wherein the data storage system is a distributed scale-out storage system.

14. A method, comprising:

iteratively accessing, at a defined time interval, (i) a first plurality of snapshots and (ii) one or more second pluralities of snapshots of (i) a third storage container and (ii) one or more fourth storage containers, respectively, wherein the containers are associated with a same data storage system, and wherein the first snapshots are performed concurrently with the one or more second snapshots;

estimating a current aggregate state of each of the containers using the corresponding snapshots;

synchronizing the estimated current aggregate state of each of the containers based on at least one change thereof occurring between a first time at which the last iteratively accessed snapshot of the corresponding plurality of snapshots was created and a second time at which a global statistics aggregator initiates an estimate of a consistent aggregate state;

perform the estimating of the consistent aggregate state based on the synchronized aggregate state of each of the containers; and estimating one or more data storage parameters and/or statistics based on the estimated consistent aggregate state.

15. The method of claim 14, further comprising:

recording a unique ID corresponding to one of the containers for which one of the last iteratively accessed snapshots was accessed, and recording a time at which the one snapshot was created, wherein "i" is an integer between 1 to N, and N is the number of storage containers.

16. The method of claim 15, wherein synchronizing event aggregation comprises:

extracting one or more events for each of the containers between the first time and the second time, and estimating aggregate statistics of the extracted events.

17. The method of claim 16, wherein the method comprises perform the estimating of the consistent aggregate state based on the estimated aggregate statistics.

18. The method of claim 15, further comprising periodically updating the consistent aggregate state of the data storage system based on event-based aggregation for all the storage containers whose IDs have been recorded.

19. The method of claim 14, wherein the data storage system is a distributed scale-out storage system.

20. The method of claim 14, wherein the one or more data storage parameters and/or statistics comprise total storage size, total number of files, number of files per file extension, size of files per file extension, number of files per file type, size of files per file type, number of files in a defined size range, number of files modified in a defined time range, size of files modified in a defined time range, number of files and their modification time in a defined time range, size of files and their modification time in a defined time range, or combinations thereof.

* * * * *